United States Patent
Perozek et al.

(10) Patent No.: US 6,917,012 B2
(45) Date of Patent: Jul. 12, 2005

(54) REDUCING ELECTROMAGNETIC FEEDBACK DURING LASER SHOCK PEENING

(75) Inventors: Paul Michael Perozek, Cincinnati, OH (US); Wayne Lee Lawrence, Sardinia, OH (US)

(73) Assignee: General Electric Company, Schenectady, NY (US)

( * ) Notice: Subject to any disclaimer, the term of this patent is extended or adjusted under 35 U.S.C. 154(b) by 73 days.

(21) Appl. No.: 10/613,501

(22) Filed: Jul. 3, 2003

(65) Prior Publication Data

US 2005/0000953 A1 Jan. 6, 2005

(51) Int. Cl.[7] .............................................. B23K 26/06
(52) U.S. Cl. .............................. 219/121.73; 219/121.78
(58) Field of Search ....................... 219/121.73, 121.78, 219/121.79, 121.81

(56) References Cited

U.S. PATENT DOCUMENTS

| | | | |
|---|---|---|---|
| 3,850,698 A | 11/1974 | Mallozzi et al. | |
| 4,401,477 A | 8/1983 | Clauer et al. | |
| 4,937,421 A | 6/1990 | Ortiz, Jr. et al. | |
| 5,127,019 A | 6/1992 | Epstein et al. | |
| 5,131,957 A | 7/1992 | Epstein et al. | |
| 5,325,456 A | 6/1994 | Cullen et al. | |
| 5,492,447 A | 2/1996 | Mannava et al. | |
| 5,531,570 A | 7/1996 | Mannava et al. | |
| 5,591,009 A | 1/1997 | Mannava et al. | |
| 5,674,328 A | 10/1997 | Mannava et al. | |
| 5,674,329 A | 10/1997 | Mannava et al. | |
| 5,730,811 A * | 3/1998 | Azad et al. .................. | 148/565 |
| 5,756,965 A | 5/1998 | Mannava | |
| 5,932,120 A | 8/1999 | Mannava et al. | |
| 6,021,154 A * | 2/2000 | Unternahrer ................ | 372/108 |
| 6,198,069 B1 * | 3/2001 | Hackel et al. ........... | 219/121.6 |
| 6,373,876 B1 * | 4/2002 | Dulaney et al. .............. | 372/98 |
| 6,385,228 B1 | 5/2002 | Dane et al. | |
| 6,426,838 B1 | 7/2002 | Rudeen | |
| 6,541,733 B1 | 4/2003 | Mannava et al. | |

OTHER PUBLICATIONS

"Component Database", High Energy Laser Optics: Global Component Database, 2 pages, Jun. 26, 2003.
"Plate Polarizers", Melles Griot, pp. 14.18 & 14.19.
"Application Notes for Faraday Rotators and Isolators", The Faraday or Magneto–Optic Effect, 3 pages, Jun. 23, 2003.
"Polarizers / optical components", Glan–Taylor Calcite Air Spaced Polarizer, 9 pages, Jun. 26, 2003.
"Fiber Optic Isolators", Photonics, Newport, pp. 270–272, Jun. 23, 2003.
"Faraday Rotators and Isolators", EOT, Electro–Optics Technology, Inc., 6 pages, Jun. 23, 2003.
"PBSK—High Energy Broadband Polarizing Beamsplitter Cube", CVI Laser Corporation, 5 pages, 1–800–296–9541.

* cited by examiner

*Primary Examiner*—M. Alexandra Elve
(74) *Attorney, Agent, or Firm*—William Scott Andes; Steven J. Rosen

(57) ABSTRACT

A laser shock peening apparatus includes a laser unit for generating at least one laser beam aimed at a laser shock peening area and an anti-feedback means for preventing electromagnetic radiation reflections from the target area from entering the laser unit during laser shock peening and the anti-feedback means is located between the laser unit and a final focusing lens. The anti-feedback means may include an optical isolator at an output of the laser unit such as a faraday isolator. Alternative optical isolators may include thin film polarizers, glan prism polarizers, independent pig tailed optical isolators, mirrors with enhanced P or S polarization coatings. The laser unit may include an oscillator and a final amplifier and the output of the laser unit located after the final amplifier.

19 Claims, 6 Drawing Sheets

REDUCING ELECTROMAGNETIC FEEDBACK DURING LASER SHOCK PEENING

BACKGROUND OF THE INVENTION

1. Field of the Invention

This invention relates to laser shock peening and, more particularly, to apparatus and methods for minimizing or eliminating electromagnetic feedback during laser shock peening laser.

2. Description of Related Art

Laser shock peening (LSP) or laser shock processing, as it is also referred to, is a process for producing a region of deep compressive residual stresses imparted by laser shock peening a surface area of an article. Laser shock peening typically uses one or more radiation pulses from high and low power pulsed lasers to produce an intense shock wave at the surface of an article similar to methods disclosed in U.S. Pat. No. 3,850,698 entitled "Altering Material Properties"; U.S. Pat. No. 4,401,477 entitled "Laser Shock Processing"; and U.S. Pat. No. 5,131,957 entitled "Material Properties". Laser shock peening, as understood in the art and as used herein, means utilizing a pulsed laser beam from a laser beam source to produce a strong localized compressive force on a portion of a surface by producing an explosive force at the impingement point of the laser beam by an instantaneous ablation or vaporization of a thin layer of that surface or of a coating (such as tape or paint) on that surface which forms a plasma.

Laser shock peening is being developed for many applications in the gas turbine engine field, some of which are disclosed in the following U.S. Pat. No. 5,756,965 entitled "On The Fly Laser Shock Peening"; U.S. Pat. No. 5,591,009 entitled "Laser shock peened gas turbine engine fan blade edges"; U.S. Pat. No. 5,531,570 entitled "Distortion control for laser shock peened gas turbine engine compressor blade edges"; U.S. Pat. No. 5,492,447 entitled "Laser shock peened rotor components for turbomachinery"; U.S. Pat. No. 5,674,329 entitled "Adhesive tape covered laser shock peening"; and U.S. Pat. No. 5,674,328 entitled "Dry tape covered laser shock peening", all of which are assigned to the present Assignee.

Laser peening has been utilized to create a compressively stressed protective layer at the outer surface of an article which is known to considerably increase the resistance of the article to fatigue failure as disclosed in U.S. Pat. No. 4,937,421 entitled "Laser Peening System and Method". These methods typically employ a curtain of water flowed over the article or some other method to provide a plasma confining medium. This medium enables the plasma to rapidly achieve shockwave pressures that produce the plastic deformation and associated residual stress patterns that constitute the LSP effect. The curtain of water provides a confining medium, to confine and redirect the process generated shockwaves into the bulk of the material of a component being LSP'D, to create the beneficial compressive residual stresses.

High energy laser beams, from about 20 to about 50 joules, or low energy laser beams, from about 3 to about 10 joules, have been used and other levels are contemplated. See, for example, U.S. Pat. No. 5,674,329 (Mannava et al.), issued Oct. 7, 1997 (LSP process using high energy lasers) and U.S. Pat. No. 5,932,120 (Mannava et al.), issued Aug. 3, 1999 (LSP process using low energy lasers). Low energy laser beams can be produced using different laser materials such as neodymium doped yttrium aluminum garnet (Nd YAG), Nd:YLF, and others.

A combination of the energy of the laser and the size of the laser beam provides an energy density or fluence that is usually about 200 $J/cm^2$. Laser shock peened spots are typically formed in overlapping rows of overlapping spots. Typically, overlaps of about 30% of diameters between both spots in a row and between spots in adjacent rows are used. The laser shock peened spots and laser beams are typically circular in shape but may have other shapes such as oval or elliptical (see U.S. Pat. No. 6,541,733, entitled "Laser Shock Peening Integrally Bladed Rotor Blade Edges" by Mannava, et al., issued Apr. 1, 2003.

The pressure pulse from the rapidly expanding plasma imparts a traveling shock wave into the component. This compressive shock wave caused by the laser pulse results in deep plastic compressive strains in the component. The blast wave energy travels hemispherically, partially into the article being laser shock peened behind the and partially into the confining medium such as the curtain of water. The confining medium reflects some or all of the outward traveling energy back into the article to enhance the energy coupling for LSP. Since the LSP process uses water and often the article is made of metal, the potential for electromagnetic radiation reflections from the incoming laser pulse is highly probable.

These reflections can be detrimental to both the LSP process and the optical components within the laser for several reasons. If the reflections pass through an optical amplifier such as those used in a master oscillator power amplifier (MOPA) laser system which are commonly used for LSP processing, their energy can be amplified throughout the entire laser system thus causing random uncontrolled laser pulses to be generated. These random laser pulses can physically damage the ablative and/or the article. These random laser pulses have the ability to physically damage components within the laser system, thus rendering it inoperable. Finally, these random laser pulses can reduce the energy gain of any optical amplifiers, and therefore reduce the process capability of LSP. LSP laser systems using ND:YAG and any lasing mediums with high small signal gains are extremely susceptible to adverse effects from target reflections. This problem probably applies to all lasing mediums used in the LSP process.

Thus, it is highly desirable to have a laser shock peening apparatus that includes a technique or apparatus for preventing light reflections from reentering a laser system used for laser shock peening (LSP). It is highly desirable to provide isolation of electromagnetic radiation feedback from the target during laser shock peening and prevent light reflections from reentering a laser system used for laser shock peening (LSP).

SUMMARY OF THE INVENTION

A laser shock peening apparatus includes a laser unit for generating at least one laser beam aimed at a laser shock peening area and an anti-feedback means for preventing electromagnetic radiation reflections from the target area from entering the laser unit during laser shock peening and the anti-feedback means is located between the laser unit and a final focusing lens. The anti-feedback means may include an optical isolator at an output of the laser unit such as a faraday isolator. The faraday isolator may have an entrance polarizer, a faraday rotator, and an exit polarizer and the faraday rotator may have a high verdet constant material positioned in an axial magnetic field.

Various types of optical isolators may be used. The optical isolator may include at least one thin film polarizer or at least one glan prism polarizer. The optical isolator may include at least one circular polarizer or at least one independent pig tailed optical isolator. The optical isolator may include at least one mirror with an enhanced P or S polarization coating. The laser unit includes the oscillator and the final amplifier and the output of the laser unit is located after the final amplifier.

The anti-feedback means for laser shock peening apparatus may further include, in additions to the optical isolators, a laser beam centerline of the laser unit located in a first plane, a second plane passing through the target area, parallel, and offset from the first plane, beam bending optics located after the anti-feedback means and effective for bending the laser beam centerline from the first plane to the second plane. One particular embodiment of the beam bending optics is effective for bending the laser beam centerline at an acute angle more than 3 degrees from the first plane.

DETAILED DESCRIPTION OF THE INVENTION

Figure 1:
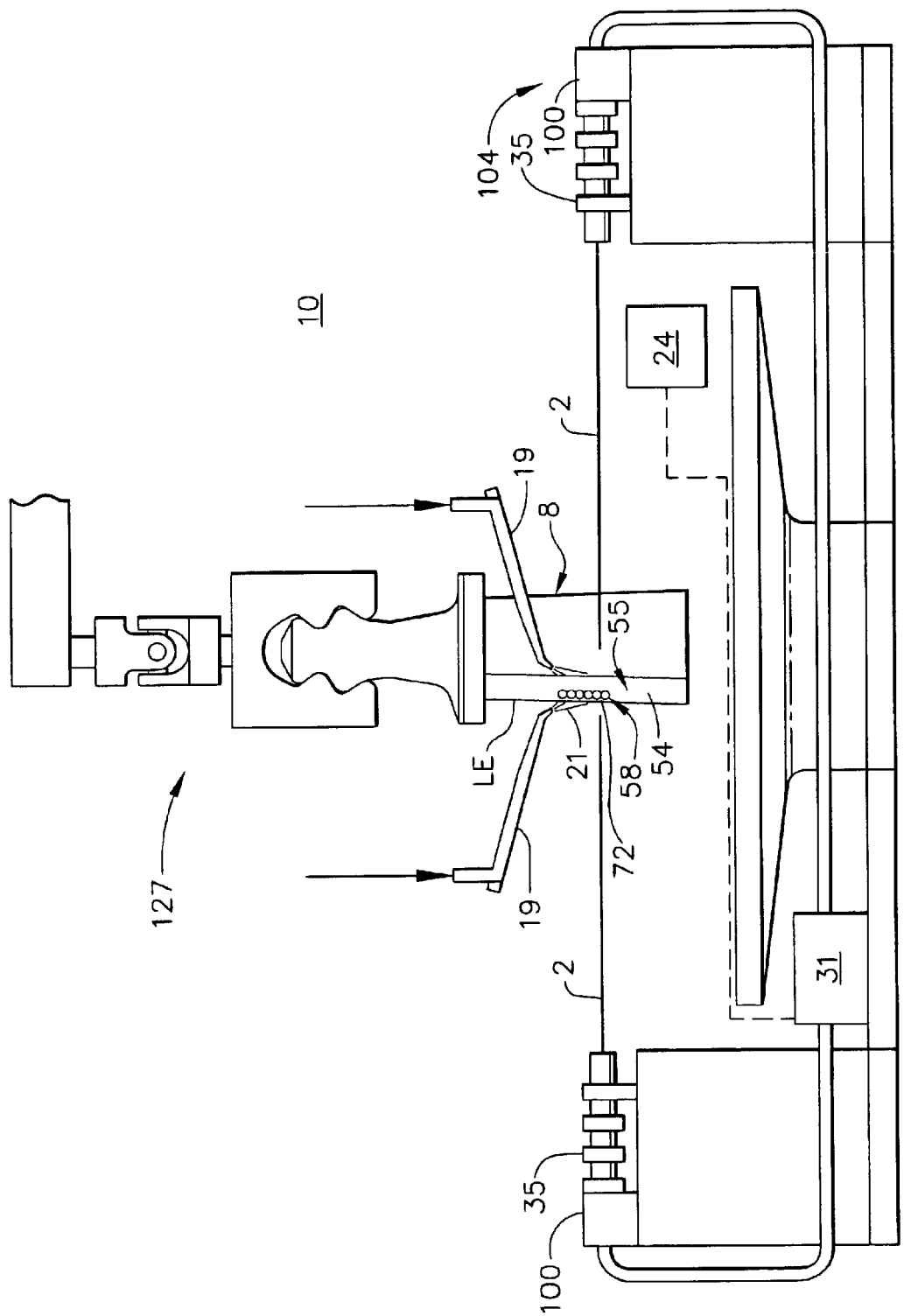
FIG. 1 is a schematical illustration of a laser shock peening system with an optical isolator for minimizing or eliminating electromagnetic feedback during laser shock peening laser.

Illustrated in FIG. 1 is a shock peening apparatus 10 for laser shock peening an article or workpiece illustrated by a gas turbine engine blade 8 mounted in a multi-axis computer numerically controlled (CNC) manipulator 127. Stationary laser beams 2 are directed towards target areas 72. The laser shock peening apparatus 10, illustrated in FIGS. 1 and 2, includes a laser unit 31 having an oscillator 33 and a pre-amplifier 47 and a beam splitter 49 which feeds the pre-amplified laser beam into two beam optical transmission circuits 43. Each of the beam optical transmission circuits 43 includes a first amplifier 39, a second and final amplifier 41, and optics 35. The optics 35 include optical elements that transmit and focus the laser beam 2 on laser shock peening surfaces 55. A controller 24 may be used to modulate and fire the laser beam apparatus to fire the laser beam 2 on coated the laser shock peening surface 55 in a controlled manner and control the operation and movement of the manipulator 127.

Laser shock peening surfaces 55, located in the target areas 72, are illustrated on pressure and suction sides 46 and 48, respectively, of a leading edge LE of the blade 8. The laser shock peening surfaces 55 are coated with an ablative coating 57 such as paint or adhesive tape to form coated surfaces as disclosed in U.S. Pat. Nos. 5,674,329 and 5,674,328. The coating 57 provides an ablative medium over which a clear containment medium is placed, such as a fluid curtain such as a curtain of flowing water 21. During laser shock peening, the blade 8 is moved while the stationary laser beams 2 are fired through curtains of flowing water 21, dispensed by water nozzles 19, on the laser shock peening surfaces 55. The laser shock peening process is typically used to form overlapping laser shock peened circular spots 58 on laser shock peened surfaces 54.

Laser beam shock induced deep compressive residual stresses are formed in compressive pre-stressed regions 56. The compressive residual stresses are generally about 50–150 KPSI (Kilo Pounds per Square Inch) and extend from the laser shock peened surfaces 54 to a depth of about 20–50 mils into the pre-stressed regions continuously. The laser beam shock induced deep compressive residual stresses are produced by repetitively firing the laser beams 2 which are typically defocused plus or minus a few hundred mils with respect to the laser shock peening surface 55.

The laser beams 2 rapidly ablate the coating 57 generating plasma which results in shock waves on the surface of the material. Other ablative materials may be used to coat the surface as suitable alternatives to paint. These coating materials include metallic foil or adhesive plastic tape as disclosed in U.S. Pat. Nos. 5,674,329 and 5,674,328. The articles material may also be ablated if no ablative coating 57 is used. These shock waves are redirected towards the coated surfaces by the curtain of flowing water 121 to generate travelling shock waves (pressure waves) in the material below the coated surfaces. The amplitude and quantity of these shockwaves determine the depth and intensity of compressive stresses. The ablative coating 57 is used to protect the target surface and also to generate plasma.

The laser shock peening process uses water and often the article is made of metal and, thus, the potential for electromagnetic radiation reflections from the incoming laser pulse is highly probable. These reflections can be detrimental to both the LSP process and the optical components within the laser for several reasons. If the reflections pass through an optical amplifier such as those used in a master oscillator power amplifier (MOPA) laser system which are commonly used for LSP processing, their energy can be amplified throughout the entire laser system thus causing random uncontrolled laser pulses to be generated. These random laser pulses can physically damage the ablative and/or the article. These random laser pulses have the ability to physically damage components within the laser system, thus, rendering it inoperable. Finally, these random laser pulses can reduce the energy gain of any optical amplifiers and, therefore, reduce the process capability of LSP. LSP laser systems using ND:YAG and any lasing mediums with high small signal gains are extremely susceptible to adverse effects from target reflections. This problem probably applies to all lasing mediums used in the LSP process. The problem is particularly acute for laser shock peening with low energy lasers having an output in a range of about 3–10 joules as disclosed in U.S. Pat. No. 5,932,120.

Figure 2:
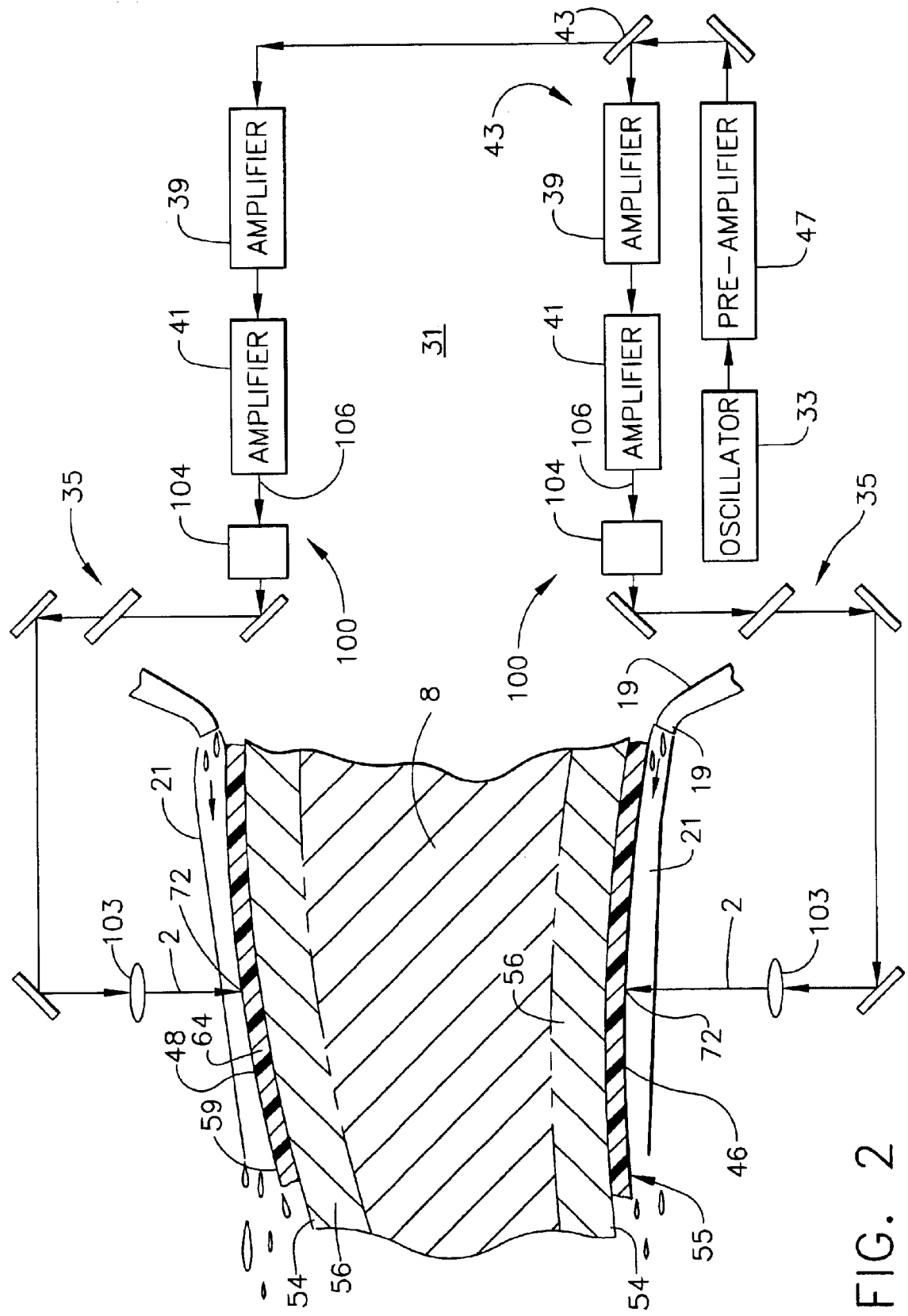
FIG. 2 is a partial schematical illustration of a laser and optics of the laser shock peening system illustrated in FIG. 1.
Figure 3:
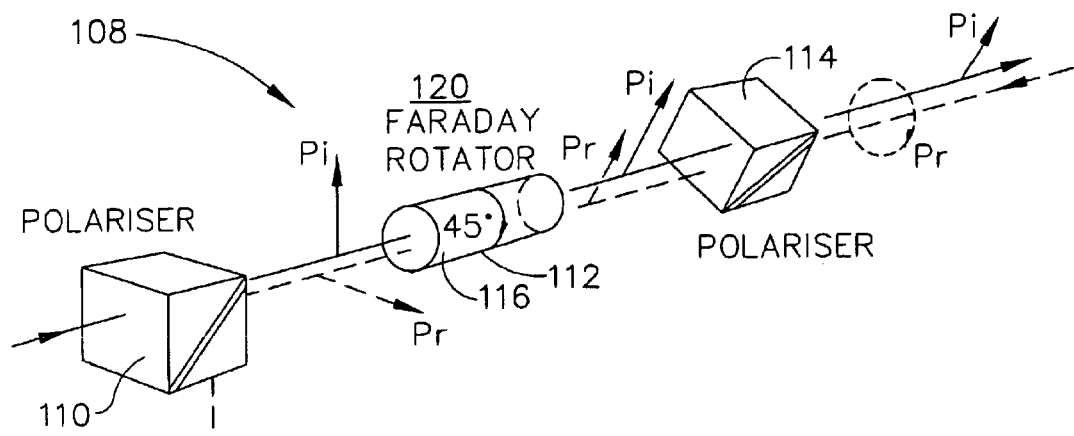
FIG. 3 is a schematical illustration of a faraday isolator that may be used as the optical isolator illustrated in FIG. 1.

In order to minimize or eliminate electromagnetic feedback during laser shock peening laser an anti-feedback means 100 for preventing electromagnetic radiation reflections from the target area 72 from entering the laser unit during laser shock peening is located between the laser unit 31 and a final focusing lens 103 of the optics 35 as illustrated in FIGS. 1 and 2. The anti-feedback means may include an optical isolator 104 at an output 106 of the laser unit 31 such as a faraday isolator 108 which is schematically illustrated in FIG. 3. The faraday isolator 108 may have an entrance polarizer 110, a faraday rotator 112, and an exit polarizer 114 and the faraday rotator 112 may have a high verdet constant material 116 positioned in an axial magnetic field 120.

Figure 4:
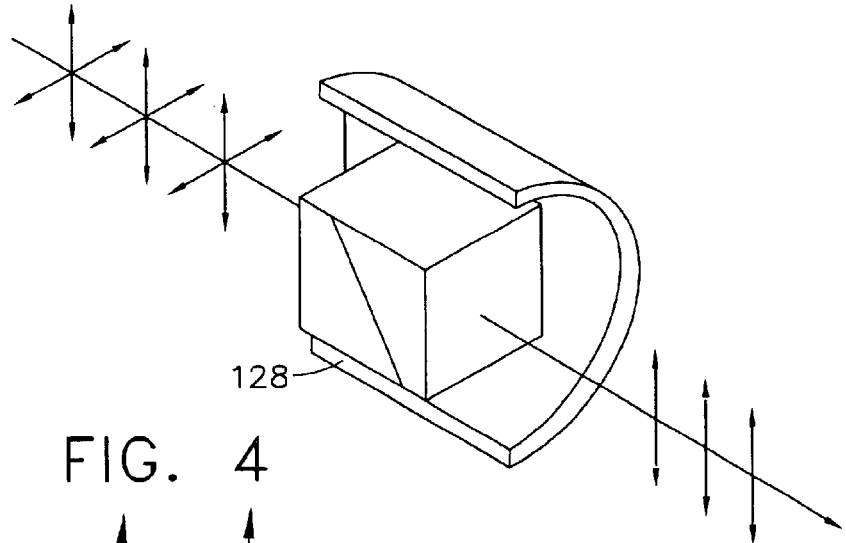
FIG. 4 is a schematical illustration of a Glan laser linear polarizer that may be used as the optical isolator illustrated in FIG. 1.
Figure 5:
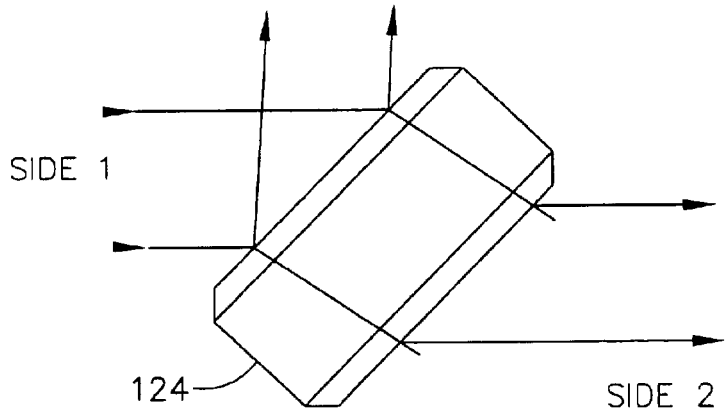
FIG. 5 is a schematical illustration of a plate circular polarizer that may be used as the optical isolator illustrated in FIG. 1.
Figure 6:
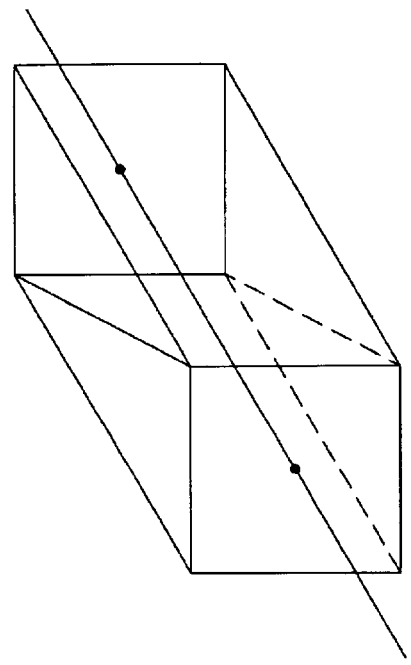
FIG. 6 is a schematical illustration of a Glan Thompson polarizer that may be used as the optical isolator illustrated in FIG. 1.
Figure 7:
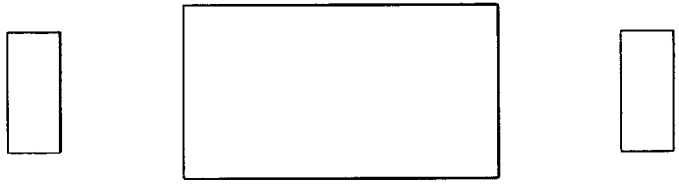
FIG. 7 is a schematical illustration of circular polarizer combinations that may be used as the optical isolator illustrated in FIG. 1.
Figure 9:
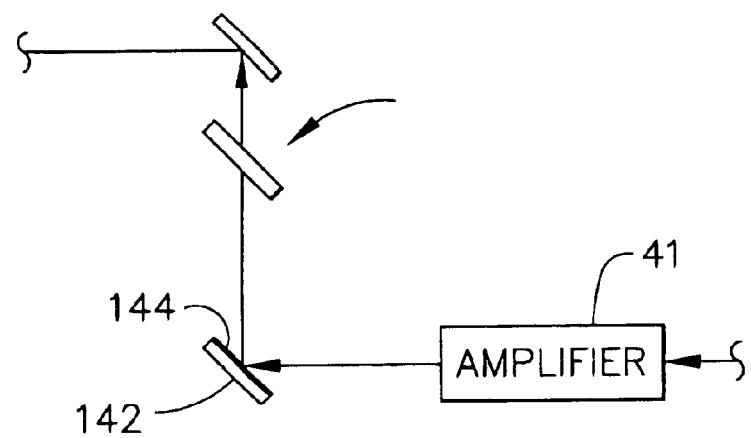
FIG. 9 is a schematical illustration of a mirror with an enhanced P polarization coating.
Figure 10:
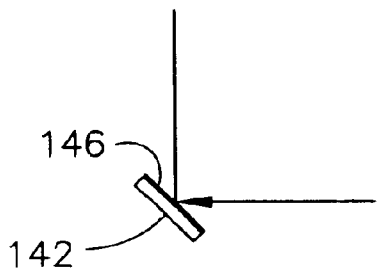
FIG. 10 is a schematical illustration of a mirror with an enhanced S polarization coating.
Figure 11:
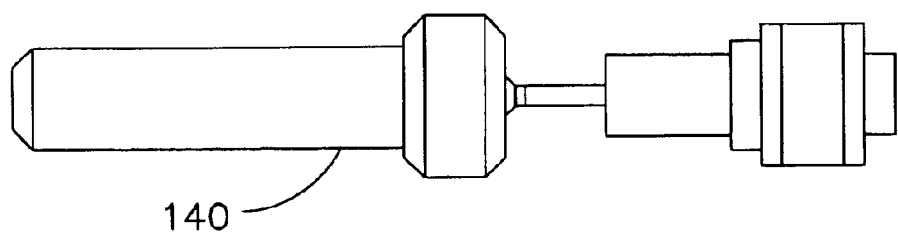
FIG. 11 is a schematical illustration of a pig tailed optical isolator.

Various types of optical isolators 104 may be used. Other embodiments of the optical isolator 104 include at least one thin film polarizer 124 as schematically illustrated in FIG. 5 (also referred to as plate polarizers) or at least one glan prism polarizer 128 as schematically illustrated in FIG. 4. The optical isolator 104 may include at least one circular polarizer as schematically illustrated in FIG. 7 or at least one independent pig tailed optical isolator 140 as schematically illustrated in FIG. 11. The optical isolator 104 may include at least one mirror 142 with an enhanced P polarization coating 144 or an enhanced S polarization coating 146 as schematically illustrated in FIG. 9. The laser unit includes the oscillator 33 and the final amplifier 41 and the output 106 of the laser unit is located after the final amplifier.

Figure 8:
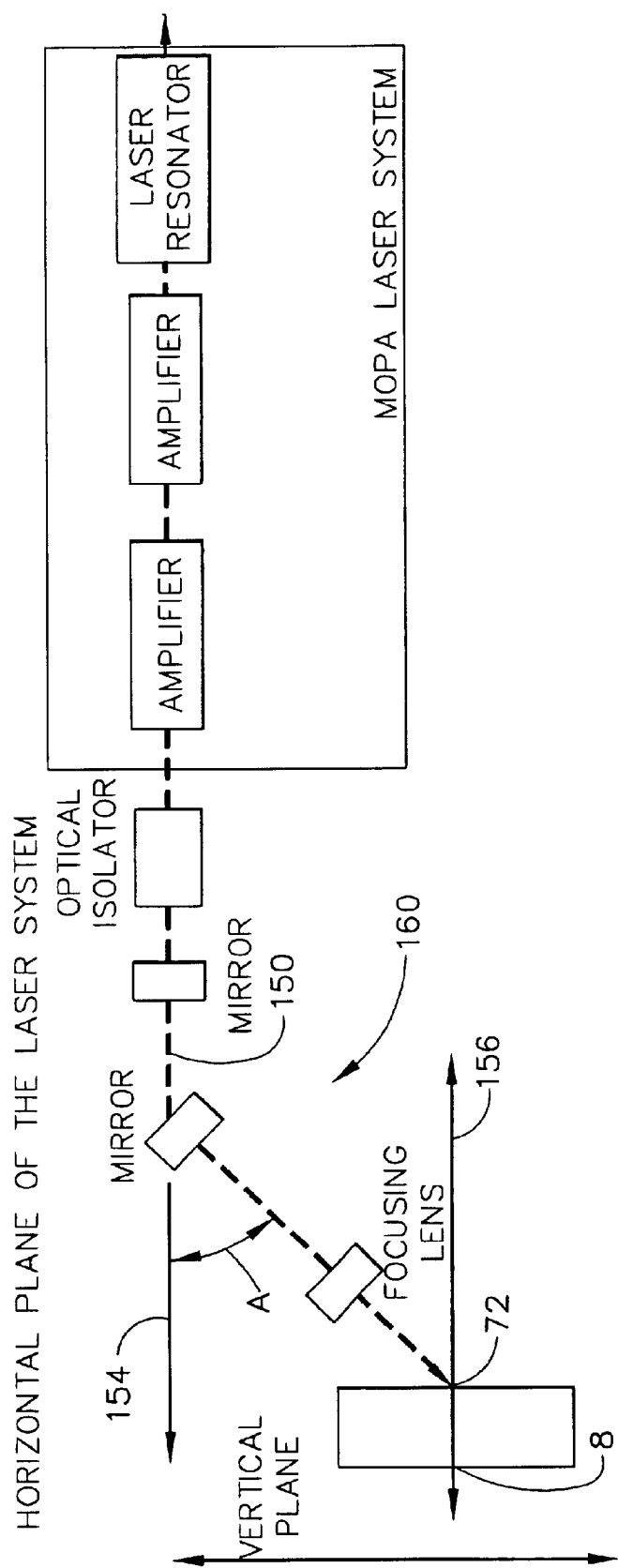
FIG. 8 is a schematical illustration of a laser beam centerline of the laser unit located in a first plane and beam bending optics located after the anti-feedback means illustrated in FIG. 1.

Referring to FIG. 8, the anti-feedback means 100 for laser shock peening apparatus 10 may further include, in addition to the optical isolators 104, a laser beam centerline 150 of the laser unit 31 located in a first plane 154, a second plane 156 passing through the target area 72, parallel to, and offset from the first plane. Beam bending optics 160 located after the anti-feedback means 100 are effective for bending the laser beam centerline 150 from the first plane to pass through the second plane. One embodiment of the beam bending optics 160 is effective for bending the laser beam centerline 150 at an acute angle A more than 3 degrees from the first plane.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A laser shock peening apparatus comprising:
   a laser unit for generating at least one laser beam aimed at a laser shock peening area,
   an anti-feedback means for preventing electromagnetic radiation reflections from the target area from entering the laser unit during laser shock peening, and
   the anti-feedback means located between the laser unit and a final focusing lens.

2. An apparatus as claimed in claim 1 wherein the anti-feedback means includes an optical isolator at an output of the laser unit.

3. An apparatus as claimed in claim 2 wherein the optical isolator is a faraday isolator.

4. An apparatus as claimed in claim 3 wherein the faraday isolator includes an entrance polarizer, a faraday rotator, and an exit polarizer.

5. An apparatus as claimed in claim 4 wherein the faraday rotator includes a high verdet constant material positioned in an axial magnetic field.

6. An apparatus as claimed in claim 2 wherein the optical isolator is at least one thin film polarizer.

7. An apparatus as claimed in claim 2 wherein the optical isolator is at least one glan prism polarizer.

8. An apparatus as claimed in claim 2 wherein the optical isolator is at least one circular polarizer.

9. An apparatus as claimed in claim 2 wherein the optical isolator is at least one independent pig tailed optical isolator.

10. An apparatus as claimed in claim 2 wherein the optical isolator is at least one independent pig tailed optical isolator.

11. An apparatus as claimed in claim 2 wherein the optical isolator is at least one mirror with an enhanced P polarization coating.

12. An apparatus as claimed in claim 2 wherein the optical isolator is at least one mirror with an enhanced S polarization coating.

13. An apparatus as claimed in claim 1 wherein the laser unit includes an oscillator and a final amplifier, and an output of the laser unit located after the final amplifier.

14. An apparatus as claimed in claim 13 wherein the anti-feedback means includes an optical isolator at the output of the laser unit.

15. An apparatus as claimed in claim 14 wherein the optical isolator is a faraday isolator.

16. An apparatus as claimed in claim 15 wherein the faraday isolator includes an entrance polarizer, a faraday rotator, and an exit polarizer.

17. An apparatus as claimed in claim 16 wherein the faraday rotator includes a high verdet constant material positioned in an axial magnetic field.

18. An apparatus as claimed in claim 2 further comprising:
   a laser beam centerline of the laser unit located in a first plane,
   a second plane passing through the target area parallel to, and offset from the first plane,
   beam bending optics located after the anti-feedback means, and
   the beam bending optics being effective for bending the laser beam centerline from the first plane to pass through the second plane.

19. An apparatus as claimed in claim 18 further comprising the beam bending optics being effective for bending the laser beam centerline at an acute angle A more than 3 degrees from the first plane.

* * * * *